US012373256B1

(12) United States Patent
Das et al.

(10) Patent No.: US 12,373,256 B1
(45) Date of Patent: Jul. 29, 2025

(54) GPU RESOURCE USAGE TRACKING IN MACHINE-LEARNED MODEL EXECUTION SYSTEM USING INFERENCE WRAPPER

(71) Applicant: Zoox, Inc., Foster City, CA (US)

(72) Inventors: Subhasis Das, Menlo Park, CA (US); Jeffrey Ronald Pyke, Foster City, CA (US); Zejia Zheng, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 718 days.

(21) Appl. No.: 17/537,985

(22) Filed: Nov. 30, 2021

Related U.S. Application Data

(60) Provisional application No. 63/124,307, filed on Dec. 11, 2020.

(51) Int. Cl.
*G06F 9/50* (2006.01)
*G06N 5/04* (2023.01)

(52) U.S. Cl.
CPC .............. *G06F 9/5027* (2013.01); *G06N 5/04* (2013.01)

(58) Field of Classification Search
None
See application file for complete search history.

(56) References Cited

U.S. PATENT DOCUMENTS

| | | | | |
|---|---|---|---|---|
| 11,463,554 | B2 * | 10/2022 | Chaysinh | H04L 47/83 |
| 11,836,268 | B2 * | 12/2023 | Mehta | G06F 8/658 |
| 2010/0211754 | A1 * | 8/2010 | Crosby | G06F 11/3476 |
| | | | | 711/170 |
| 2016/0191357 | A1 * | 6/2016 | Orner | H04W 24/02 |
| | | | | 370/328 |
| 2017/0155721 | A1 * | 6/2017 | Kato | G06F 9/505 |
| 2017/0242727 | A1 * | 8/2017 | Crosby | G06F 9/5094 |
| 2019/0042312 | A1 * | 2/2019 | Earl | G06F 9/30123 |
| 2019/0102685 | A1 * | 4/2019 | Foster | G10L 15/1822 |
| 2019/0116589 | A1 * | 4/2019 | Shimomura | H04L 5/0055 |
| 2020/0183751 | A1 * | 6/2020 | Bonagiri | G06F 9/5055 |
| 2020/0310878 | A1 * | 10/2020 | Bower, III | G06T 1/60 |
| 2020/0379911 | A1 * | 12/2020 | Wanner | G06F 12/126 |
| 2020/0381098 | A1 * | 12/2020 | Edwards | G16H 40/67 |
| 2021/0064388 | A1 * | 3/2021 | Gardner | G06F 11/3055 |
| 2021/0406086 | A1 * | 12/2021 | Shivanna | G06F 9/505 |
| 2023/0292117 | A1 * | 9/2023 | Hemantharaja | H04L 63/065 |

* cited by examiner

*Primary Examiner* — Aimee Li
*Assistant Examiner* — Zujia Xu
(74) *Attorney, Agent, or Firm* — Lee & Hayes, P.C.

(57) ABSTRACT

Techniques for using an inference wrapper to execute a machine learned model using various types of machine learning engines are disclosed. A resource allocator may interoperate with the inference wrapper to request the utilization of resources, such as memory, and generate and log utilization data. The utilization data can be used to generate visual representations of resource utilization that can then be used to improve resource allocation for machine learned models.

20 Claims, 5 Drawing Sheets

GPU RESOURCE USAGE TRACKING IN MACHINE-LEARNED MODEL EXECUTION SYSTEM USING INFERENCE WRAPPER

CROSS-REFERENCE TO RELATED APPLICATIONS

This application claims priority to and is a non-provisional of U.S. Patent Application No. 63/124,307, filed Dec. 11, 2020, and entitled "GPU BASED REAL-TIME INFERENCE FOR AUTONOMOUS VEHICLES," the disclosure of which is incorporated by reference herein in its entirety for all purposes.

BACKGROUND

Systems that use machine learning and neural networks to perform sophisticated functions are becoming more common. These functions may be implemented using various types of machine learning and/or neural network engines the execute various machine learned or neural network models. The operations performed by during the execution of such models may be resource intensive in their utilization of various processors and associated memories due to the executing of various associated machine-learned models and/or algorithms to perform complicated tasks. The resource utilization associated with such operations may vary based on the machine learning and/or neural network engine used to perform the operations. Determining resource use in such systems which to execute machine learned and neural network models and related techniques may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
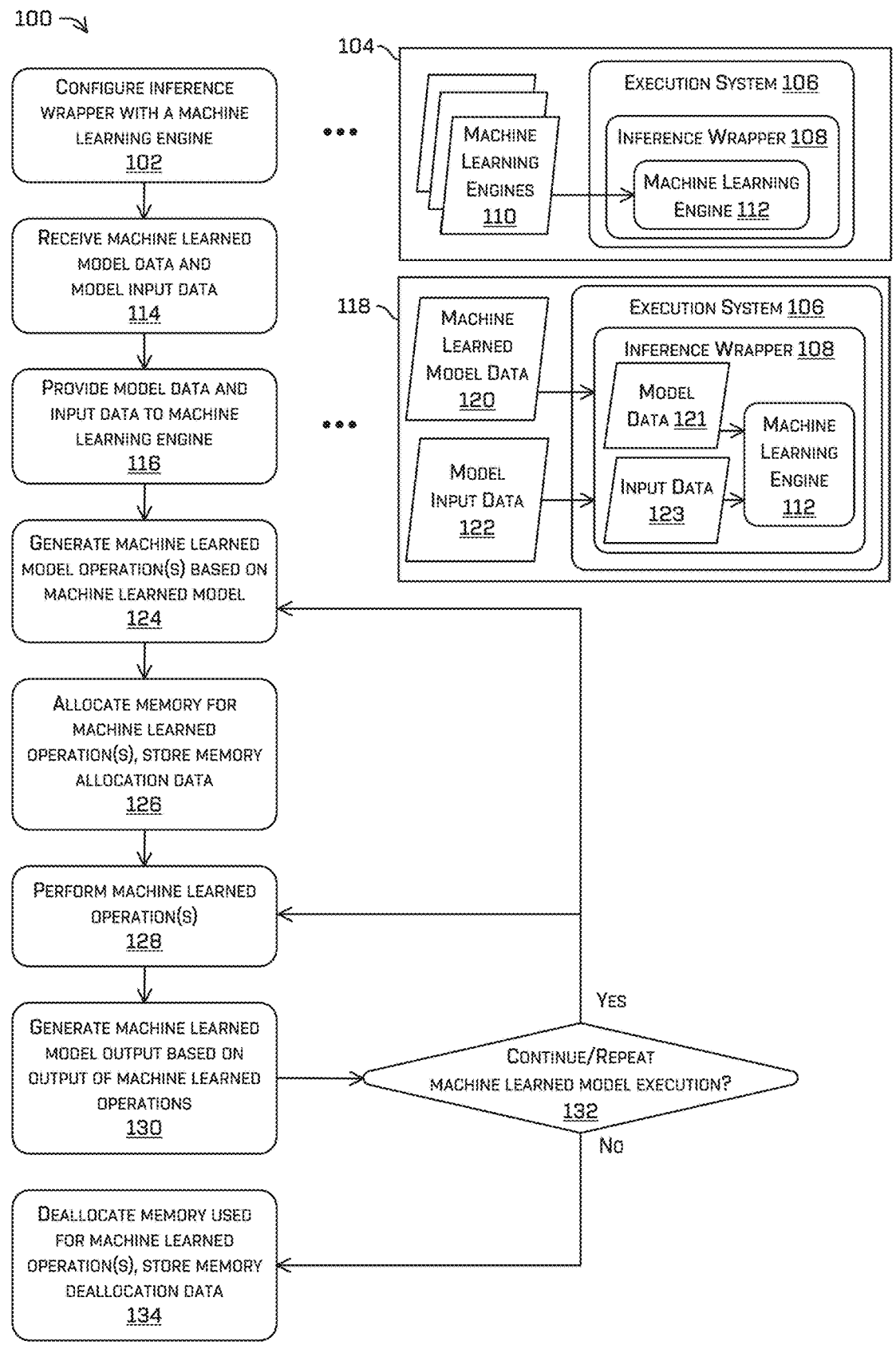
FIG. 1 is a pictorial flow diagram of an example process for configuring an inference wrapper and executing a function, such as a machine learned model using a machine learning engine, in accordance with examples of the disclosure.

Techniques for implementing a system for executing one or more algorithms which relies heavily on GPU compute, such as machine learning and/or machine learned (ML) models, may use an inference wrapper that facilitates the use of a variety of ML engines and determining an amount of resources used. In examples, an inference wrapper may be configured to interoperate with a plurality of different ML engines while providing a consistent input interface and output format. In this way, a particular ML model (and/or other executable code, software, instructions, algorithms, functions, modules, etc.) may be executed (e.g., using associated input data) using a variety of ML engines. A resource allocator may also, or instead, be configured to perform various operations and track resource (e.g., memory, processor, power, etc.) utilization data associated with such operations for use in analysis and adjustment of ML models.

The systems and techniques described herein may be directed to leveraging a flexible inference wrapper to use a variety of ML engines with a variety of ML models (and/or other executable code, software, instructions, algorithms, modules, etc.) and input data. The systems and techniques described herein can utilize the inference wrapper to more rapidly test various configurations and model parameters to more accurately determine model optimizations and improve the performance of models in production scenarios, such as controlling an autonomous vehicle. The systems and techniques described herein can also increase the efficiency of resource utilization by tracking memory allocation and deallocation, processor utilization, power utilization, generating resource utilization data, and providing such data for analysis to facilitate resource utilization optimization. The systems and techniques described herein may also facilitate improved resource utilization by performing memory and other resource allocation operations that improve upon default allocation techniques, thereby improving the efficiency of system and techniques for implementing ML models. In various examples, multiple wrappers and/or resource allocators may be used to track and control the utilization of multiple different types of resources and functions.

By improving the accuracy and efficiency of ML models that may be used in production environments, the systems and techniques described herein may improve safety outcomes because autonomous vehicles may be controlled by more accurate and efficient ML models than those available using conventional techniques. The examples described herein may result in, for example, increased certainty of object detections, increased accuracy of vehicle localizations, and more accurate and/or safer trajectory determinations for an autonomous vehicle. For example, techniques described herein may be faster and/or more robust than conventional techniques, as they may increase the reliability and efficiency of ML models used in autonomous vehicles, reducing the likelihood of unsafe conditions arising while operating a vehicle in a real-world environment. That is, techniques described herein provide a technological improvement over existing ML model design, testing, and execution techniques. In addition to improving the accuracy and efficiency of ML models generally, the systems and techniques described herein can facilitate the generation of ML models that can provide a smoother ride and improve safety outcomes by, for example, more accurately providing safe passage to an intended destination.

ML models as described herein may use deep machine learning techniques to process information and provide inference outputs, though any other techniques are contemplated. ML models can be deployed in various different technological and industrial contexts. Within computer vision systems, for example, the inference outputs of an ML model execution system may correspond to a detection, segmentation, or classification of objects within an environment, based on sensor data input to the ML model execution system. Before an ML model can be deployed to a target system, the ML model may be designed, developed, and trained. A number of different neural network frameworks and software tools exist for performing ML model design, implementation, and training. Additionally, a number of different ML engines (or execution engines) also exist for executing trained neural networks in deployment environments, by providing data to the input nodes of the neural network, executing the operations of each node and/or layer, and capturing the outputs provided via the output nodes.

The systems and techniques described herein can be implemented in a number of ways. Example implementations are provided below with reference to the following figures. Although discussed in the context of an autonomous vehicle, the techniques described herein can be applied to a variety of systems (e.g., a computer vision system, a sensor system, a robotic platform, etc.) and are not limited to autonomous vehicles. For example, the techniques described herein can be applied to semi-autonomous and/or manually operated vehicle. In another example, the techniques can be utilized in an aviation or nautical context, or in any system involving objects or entities having dimensions and/or other physical parameters that may not be known to the system. Further, although discussed in the context of originating with particular types of sensor data and processing with particular types of components, data and data structures as described herein can include any two-dimensional, three-dimensional, or multi-dimensional data such as other types of image data (e.g., stereo cameras, time-of-flight data, and the like)), radar data, sonar data, and the like. Additionally, the techniques described herein can be used with real data (e.g., captured using sensor(s)), simulated data (e.g., generated by a simulator) or any combination of the two.

Figure 2:
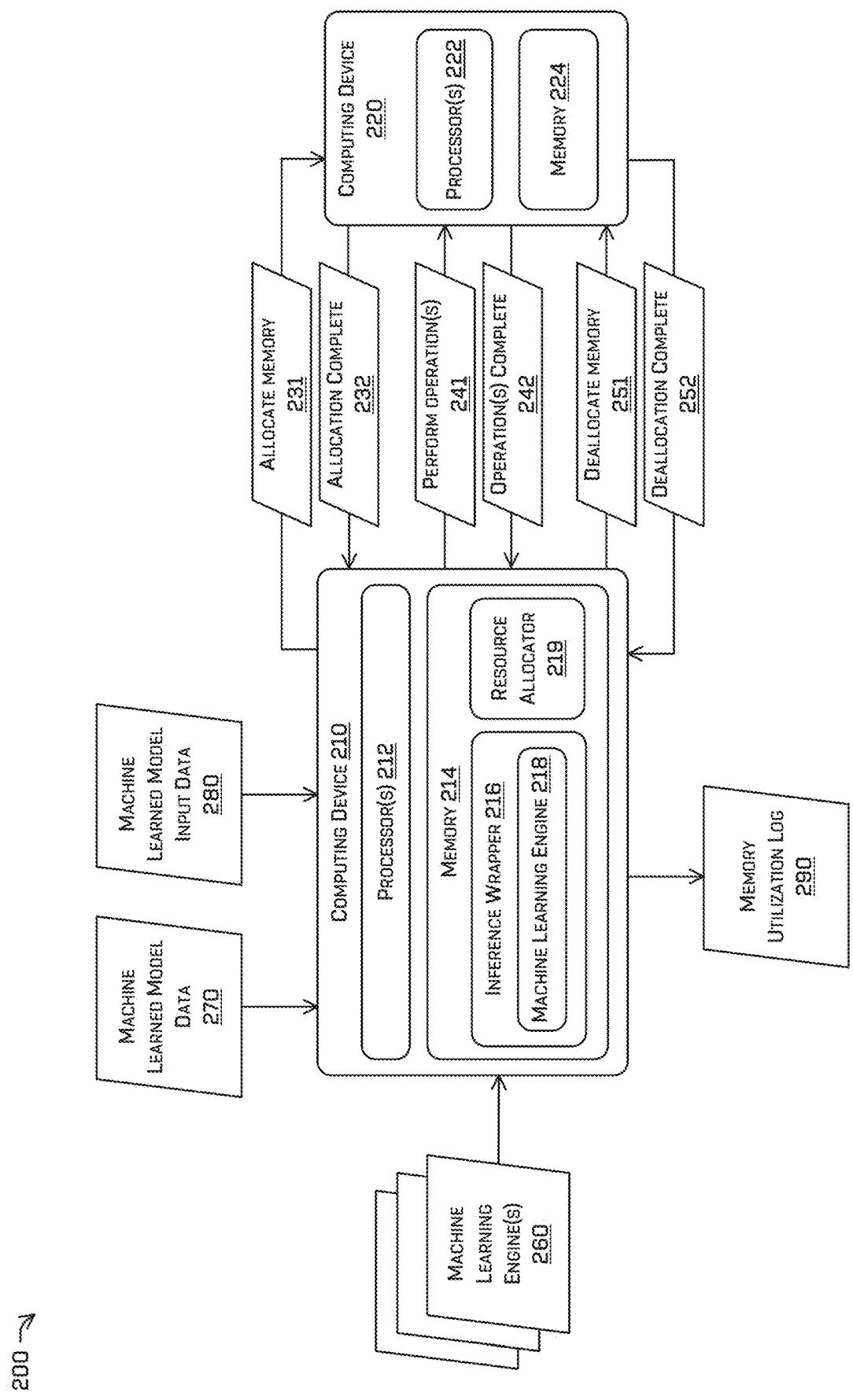
FIG. 2 is a diagrammatic representation of a system for tracking resource utilization, in accordance with examples of the disclosure.
Figure 5:
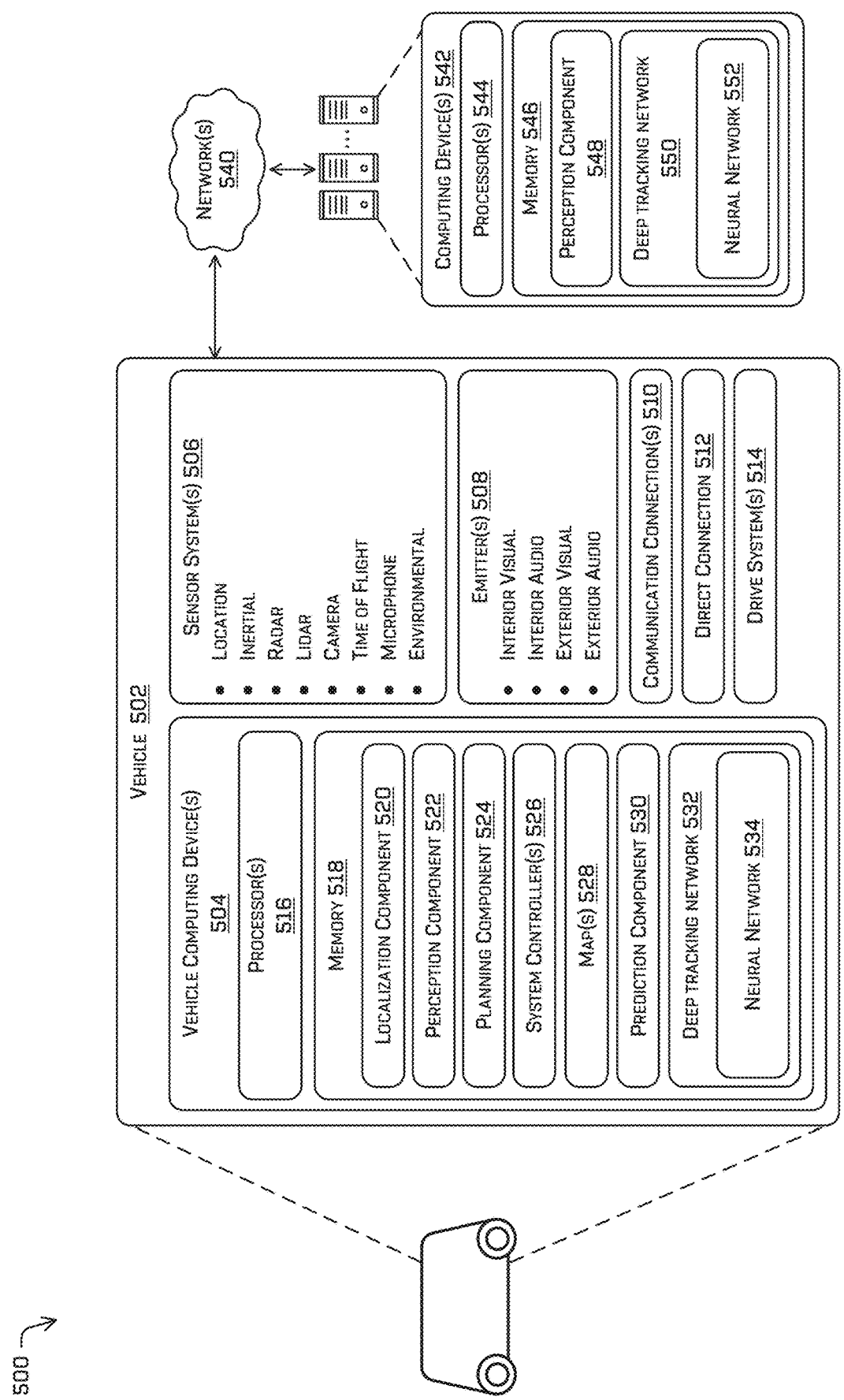
FIG. 5 depicts a block diagram of an example system for implementing the methods described herein.

FIG. 1 is a pictorial flow diagram of an example process 100 for executing an ML model using an inference wrapper. In examples, one or more operations of the process 100 may be implemented by a computing system and may use one or more components, such as the one or more of the components and systems illustrated in FIGS. 2 and 5 and described below. For example, the process 100 may be implemented by one or more components and systems that can include processor(s) 212, processor(s) 222, a memory 214, and/or a memory 224 illustrated in FIG. 2. Alternatively, or in addition, the process 100 may be implemented by one or more components and systems that can include processor(s) 544 and/or a memory 546 illustrated in FIG. 5. One or more of the operations of the process 100 may also, or instead, be implemented using one or more autonomous vehicle components, such as by using one or more of the components and systems illustrated in FIG. 5 and described below. For example, the operations of the process 100 may use one or more components and systems that can include processor(s) 516, and/or a memory 518 illustrated in FIG. 5. However, the process 100 is not limited to being performed by and/or using such components and systems, and the components and systems of FIGS. 2 and 5 are not limited to performing the process 100.

The one or more operations of the process 100, as well as any other operations, systems, and techniques described herein, may be directed to executing and/or otherwise evaluating any type of ML model using any type of actual and/or simulated input data, including, but not limited to image data, sensor data, and detection data, etc. The inference wrappers described herein may be configured to interoperate and/or otherwise facilitate the use of any type of ML engine. As used herein, an ML engine may be any machine learning and/or artificial intelligence training and/or inference engine, library, kit, framework, or code that may facilitate execution of ML model operations. Examples of ML engines as described herein may include, but are not limited to, TensorFlow, TENSORRT, PyTorch, Convolutional Architecture for Fast Feature Embedding (Caffe), and Caffe2. In some examples, the ML engines may also be referred to as components, languages, types, execution environments, and the like.

At operation 102, an inference wrapper configured at an ML model execution system may be configured with an ML engine. In examples, an inference wrapper may be configured to interoperate with multiple ML engines. For individual engines, an inference wrapper may be configured to provide ML model data and ML model input data to the individual engine. The inference wrapper may also, or instead, provide output data generated by an individual engine. In this way, the inference wrappers described herein may facilitate the execution of a particular ML model using more than one ML engine.

An example 104 illustrates an example inference wrapper 108 configured at an example execution system 106 that may support the execution of an ML model using any of the supported plurality of ML engines 110. In this example, the inference wrapper 108 may be configured with the ML engine 112.

At operation 114, the ML model execution system may receive ML model data defining an ML model to be executed by the system. As noted herein, this ML model data may include data representing the structure of a network (e.g., neural network), such as an architecture, arrangement of nodes, layers, weights and/or operations to be performed within the network. This ML model data may be in a particular form or format, such as a TensorFlow format, TENSORRT format, PyTorch format, Caffe format, or Caffe2 format. In examples, one or more other types of executable code, software, instructions, etc. may be received at operation 114 instead of, or in addition to, ML model data. For example, one or more software modules or pieces of executable code may be received for execution by the machine learning engine configured at the inference wrapper at operation 102.

Also at operation 114, the ML model execution system may receive input data for the ML model (and/or other executable code, software, instructions, etc. that may be received at operation 114). For example, the ML model execution system may receive image data, sensor data, detection data, training data, and/or any other type of data that is intended to be input to the ML model also received at operation 114 when executed by the ML engine using the inference wrapper.

At operation 116, the ML model data may be provided to the inference wrapper for use by the ML engine configured in the inference wrapper. In examples, the ML model execution system may allocate memory for the ML model data and store the ML model data in the allocated memory. The ML model execution system may then provide a pointer to the memory location at which the ML model data is stored to the inference wrapper. In some examples, the ML model execution system may convert, format, and/or otherwise alter the ML model data before or during storage of the ML model data in memory for use by the inference wrapper, while in other examples no alterations of the ML model data may be performed by the ML model execution system. The inference wrapper may then configure the ML engine with the compatible ML model.

Also at operation 116, the input data for the ML model may be provided to the inference wrapper. In examples, the ML model execution system may allocate memory for the input data and store the input data in the allocated memory. The ML model execution system may then provide a pointer to the memory location at which the input data is stored to the inference wrapper. In some examples, the ML model execution system may convert, format, and/or otherwise alter the input data before or during storage of the input data in memory for use by the inference wrapper, while in other examples no alterations of the input data may be performed by the ML model execution system. The inference wrapper may then configure the ML engine with the input data.

An example 118 illustrates the example inference wrapper 108 configured at the example execution system 106 with the ML engine 112. ML model data 120 may be provided as model data 121 (e.g., as model data that is compatible with the ML engine 112) to the inference wrapper 108. Model input data 122 may also be provided as input data 123 (e.g., as input data that is compatible with the ML engine 112) to the inference wrapper 108. In this example, pointers to the model data 121 and the input data 123 may be provided to the inference wrapper 108.

At operation 124, the inference wrapper and/or the ML engine configured within the inference wrapper may determine one or more ML model operations to be executed based on the model and input data. In examples, the operations to be performed may include all or any subset of one or more operations to be performed in the execution of any portion of one or more models, algorithms, processes, etc.

Based on the ML model operation(s) generated at operation 124, at operation 126 the inference wrapper may allocate memory for the operation(s). In examples, one or more ML model operations may be performed at a separate processing device. For instance, the ML model execution system may be implemented on one or more Central Processing Units (CPUs) of a computing system, while one or more model operations may be intended to be performed on one or more Graphics Processing Units (GPUs). In such examples, at operation 126 the inference wrapper may transmit an instruction (e.g., a memory allocation command, a memory allocation instruction, a memory allocation request, etc.) to one or more GPUs to allocate memory for the model operations. The instruction may include an amount of memory and/or any other parameters suitable for memory allocation. The inference wrapper may also receive a confirmation from the GPU(s) that the memory has been successfully allocated for the operation and/or one or more other memory allocation operation indications (e.g., an indication that the GPU failed to allocate memory, etc.). Such a confirmation may include memory allocation related data, such as the particular location of the allocated memory (e.g., memory addresses), the amount of memory successfully allocated, and/or an allocation identifier. In examples, the allocation and deallocation operations described herein may be performed via a resource allocator as described herein. For example, the inference wrapper may communicate with a resource allocator that provides instructions to other components (e.g., a GPU) to allocate, deallocate, and/or otherwise utilize resources. The resource allocator may receive confirmations and other indications from such components that it may then provide to the inference wrapper.

Further at operation 126, the inference wrapper and/or a resource allocator may generate and store an indication of the memory allocation operation, for example, for use in generating memory utilization data as described herein. This indication may include any suitable data, such as a time of transmitting the memory allocation instruction, a time of receiving a memory allocation confirmation, an amount of memory requested for allocation, an identifier of the ML model operation(s) associated with the allocation, an identifier of the one or more GPUs or other processing device to which the instruction was transmitted, an identifier of the one or more CPUs or other processing device from which the instruction was transmitted, a memory allocation identifier (e.g., address or range of addresses), one or more non-confirmation responses received (e.g., allocation failure), an identifier of one or more processes associated with the allocation, an amount of latency associated with the allocation (e.g., an amount of time between requesting the allocation and receiving a confirmation of the allocation), whether a particular piece of utilization data has met a threshold, etc. Any or all of such information may be stored with the wrapper, in wrapper-associated memory, and/or written to a more permanent location (e.g., a file, database, etc.).

Alternatively, or in addition, at operation 126 one or more instructions may be generated associated with the allocation or utilization of resources. For example, the inference wrapper may request (e.g., via a resource allocator) processor utilization, power utilization, bandwidth utilization, etc. As described herein, the inference wrapper and/or a resource allocator may track such utilization, including the requesting of resources, the releasing of resources, the confirmation and/or rejection of such requests, and the generation of data based on such requests and the associated resource utilization.

In various examples, more than one wrapper and/or allocator may be used to track different the utilization of resources and/or other functions. For example, a first wrapper may be associated with tracking memory utilization and may be associated (e.g., by a resource allocator) with memory utilization data in a utilization log, while a second wrapper may be associated with tracking processor utilization and may be associated (e.g., by the same or a different resource allocator) with processor utilization data in a utilization log. Any combination of resources, functions, wrappers, and allocators are contemplated in the instant disclosure.

At operation 128, the ML engine (e.g., executing via the inference wrapper) may perform the ML model operation(s) determined at operation 124. In examples, the inference wrapper may transmit one or more instructions to perform the ML model operation(s) to the one or more processing devices from which the inference wrapper requested a memory allocation at operation 126. These instructions may include an indication of the particular memory locations to use (e.g., memory addresses), an allocation identifier (e.g., as received in the associated allocation confirmation), an amount of memory, etc. In examples, the operation 128 may also include receiving a confirmation that the ML model operation(s) have been successfully completed. Alternatively, or in addition, the ML engine (e.g., executing via the inference wrapper) may receive one or more other related indications, such as an indication that the operation failed and/or that some other condition (e.g., error condition) has been detected that may be associated with the ML model operation. In such instances, the inference wrapper and/or resource allocator may additionally log those occurrences associated with particular memory addresses (e.g., successful call, failure, etc.). In examples, the inference wrapper may also, or instead, generate and/or log any other type of resource utilization data, for example as described herein.

At operation 130, the ML model execution system may generate ML model output based on the ML model operations. In examples, this may include storing the output in memory and providing a pointer to the memory location for use in the generating a presentation of output data. In examples, the inference wrapper may store the output data as it is generated by the ML engine (e.g., for later retrieval).

At operation 132, the ML engine (e.g., executing via the inference wrapper) may determine whether there are any other ML model operations to perform and/or whether the ML model should continue to be executed. For example, if a most recently executed ML model operation is the last ML model operation to be performed (e.g., is the final instruction in the instruction set associated with the model, if a termination condition has been satisfied, etc.), the ML model execution system may determine that the model should not continue to be executed and may move to operation 134.

If the ML engine determines at operation 132 that there are one or more further ML model operations to be performed, the ML model execution system may return to operation 124 to generate one or more next ML model operations (e.g., for execution by the ML engine via the inference wrapper), for example if another memory allocation operation is required to perform such operations. In some examples, if the operation 132 determines to continue to execute the machine learned model (e.g., "yes" in operation 132), the operation 132 may return to the operation 128 to continue execution without allocating additional memory. That is, in some examples, the techniques can include allocating a portion of memory once and using that memory for any number of operations before deallocating some or all of that portion of memory. Of course, the order of operations in the process 100 is but one example and the operations may be omitted or executed in any order or any number of times.

At operation 134, the inference wrapper may deallocate memory for the ML model operation. In examples where the ML model operation may be performed at a separate processing device, at operation 134 the inference wrapper and/or resource allocator may transmit an instruction (e.g., a memory deallocation command, a memory deallocation instruction, a memory deallocation request, etc.) to one or more GPUs to deallocate some or all of the memory that had been previously allocated for a model operation (e.g., at operation 126). The instruction may include a memory location (e.g., memory addressed), a memory allocation identifier, an amount of memory and/or any other parameters suitable for memory deallocation. The inference wrapper and/or resource allocator may also receive a confirmation from the GPU(s) that the memory has been successfully deallocated and/or one or more other memory allocation operation indications (e.g., an indication that the GPU failed to deallocate the memory, etc.). Such a confirmation may include memory deallocation related data, such as the particular location of the deallocated memory (e.g., memory addresses), the amount of memory successfully deallocated, an amount of time that the allocated memory was reserved, a memory deallocation identifier, and/or an allocation identifier (e.g., to confirm the particular allocation for which the deallocation was performed).

Further at operation 134, the inference wrapper and/or resource allocator may generate and store an indication of the memory deallocation operation, for example, for use in generating memory utilization data as described herein. This indication may include any suitable data, such as a time of transmitting the memory deallocation instruction, a time of receiving a memory deallocation confirmation, an amount of memory requested for deallocation, an identifier of the ML model operation(s) associated with the deallocation and/or the initial allocation, an identifier of the one or more GPUs or other processing device to which the instruction was transmitted, a memory deallocation identifier, a memory allocation identifier associated with the initial allocation, one or more non-confirmation responses received (e.g., deallocation failure), a portion of the memory deallocated if less than the initial amount of memory allocated, etc.

In examples, two or more of the operations 126, 128, and/or 130 may be combined. For example, the inference wrapper executing the ML engine may transmit an instruction to a separate processing device to perform the ML model operations, where the instruction explicitly or implicitly includes an instruction to allocate appropriate memory resources for the operations.

FIG. 2 illustrates a diagrammatic representation of an ML model execution system 200 configured with an inference wrapper 216 to facilitate the execution of an ML model using a variety of ML engines. A computing device 210 may serve as a primary host of the ML model execution system 200. The computing device 210 may be configured with one or more processors 212. In examples, the processor(s) 212 may be one or more CPUs. Also configured at the computing device 210 may be a memory 214.

An inference wrapper 216 may be configured in the memory 214. The inference wrapper 216 may be configured to interoperate with an ML engine 218. The ML engine 218 may any one of one or more ML engines 260 with which the inference wrapper 216 may operate. The inference wrapper 216 may be configured to accept one or more of the ML engines(s) 260 as input and/or otherwise be configured with one or more of the ML engines(s) 260. In various examples, the inference wrapper 216 may implemented as a class or module in a particular programming language, such as a C++ class.

The ML engine 218 may be configured to execute an ML model based the ML model data 270. This model data may be provided to the inference wrapper, for example, as a pointer to a memory location at which the ML model data 270 is stored. The ML model execution system 200 may have performed one or more conversion or alterations of this model data before or during storage of the model data in memory for use by the inference wrapper 216. The ML engine 218 may also be configured to execute an ML model using ML input data 280. This input data may be provided to the inference wrapper, for example, as a pointer to a memory location at which the ML input data 280 is stored. The ML model execution system 200 may have performed one or more conversion or alterations of this input data before or during storage of the input data in memory for use by the inference wrapper 216. The inference wrapper 216 may then operate the ML engine 218 to execute the model represented by the ML model data 270 using the ML model input data 280. To obtain resources and/or track the utilization of such resources, the inference wrapper 216 may interoperate with a resource allocator 219 that may (e.g., directly) transmit instructions to and/or receive indications from one or more resources (e.g., hardware components, software components, etc.).

The execution of the model represented by the ML model data 270 may include interactions with a separate processing device. For example, the computing device 210 may interact with the computing device 220 in executing the model. The computing device 220 may be configured with one or more processors 222. In examples, the processor(s) 222 may be one or more GPUs. Also configured at the computing 220 may be a memory 224. In examples, the computing device 220 may be used to perform graphics-intensive operation, such as operations associated with computer vision and image processing. Of course, though depicted in FIG. 2 for illustrative purposes as separate computing devices, it should be understood that such processors may be collocated in a single machine, though the techniques described herein may also be performed where the machines are remote from one another.

In executing the model represented by the ML model data 270, the inference wrapper 216 may issue and receive instructions on behalf of the ML engine 218. For example, the ML engine 218 may attempt to execute a particular set of ML model operations. In response to detecting this operation, the inference wrapper 216 may determine the memory requirements and the appropriate execution device (e.g., computing device 220) for the operation. The inference wrapper 216 may then transmit or otherwise cause the generation of a memory allocation request 231 sent to the computing device 220. In examples, this may be facilitated by the resource allocator 219. For example, the inference wrapper 216 may determine and/or request particular resources from the resource allocator 219, which may in turn determine the particular resource (e.g., computing device 220) and transmit resource allocation instructions to the particular resource. The inference wrapper 216 may accomplish this by utilizing local resources (e.g. buffers within memory 214) that the resource allocator 219 may then use to generate and transmit memory allocation requests. The computing device 220 may respond by allocating the memory as requested and transmitting a memory allocation confirmation 232 to the resource allocator 219. The resource allocator 219 may store a record of this memory allocation, for example in a memory utilization log 290 or in the memory 214. The record of the memory allocation may include any suitable memory allocation data, such as that described herein. The resource allocator 219 may track and record interactions with other resources and/or generate resource utilization data as described herein.

Next, the inference wrapper 216 may transmit an operation execution request 241 to the computing device 220 requesting execution of the particular ML model operations. The computing device 220 may respond by performing the particular ML model operations (e.g., using the memory allocated in response to the memory allocation request 231) and transmitting an operation completion indication 242 to the inference wrapper 216. The resource allocator 219 and/or the inference wrapper 216 may store a record of the completion of the particular ML model operation, for example in the memory utilization log 290 or in the memory 214. The record of the completion of the particular ML model operation may include any suitable operation execution data, such as that described herein.

Having completed the operations associated with the memory allocated in response to the memory allocation request 231, the inference wrapper 216 may provide an indication that execution of the operations is complete to the resource allocator 219, which may in turn transmit a memory deallocation request 251 to the computing device 220. The computing device 220 may respond by freeing or otherwise deallocating the previously allocated memory as requested and transmitting a memory deallocation confirmation 252 to the resource allocator 219. The resource allocator 219 may store a record of this memory deallocation, for example in the memory utilization log 290 or in the memory 214. The record of the memory deallocation may include any suitable memory deallocation data, such as that described herein.

In examples, the resource allocator 219 may perform processing on memory allocation and usage data to generate memory utilization data that it may store in one or more memory utilization logs, such as the memory utilization log 290. In examples, memory utilization data may include any data associated with the allocation, use, and deallocation of memory associated with one or more operations. In various examples, the resource allocator 219 may generate or otherwise determine, for a particular memory allocation request, the length of time memory was reserved, the amount of memory reserved, the location of the memory (e.g., memory addresses), one or more identifiers of the allocated memory, one or more allocation identifiers and/or deallocation identifiers, one or more errors or other indications associated with the allocation, an identifier of the ML model executing during the allocation, an identifier of the particular ML model operation that initiated the allocation, an identifier of the ML engine executing the operation, an inference wrapper identifier, an identifier of the processor or device allocating the memory, an identifier of the processor or device requesting the allocation, a process identifier for an associated process, a CPU identifier for an associated CPU, a GPU identifier for an associated GPU, a device identifier for an associated device, etc. The memory utilization log 290 may then be used to generate a visual representation (e.g., a flame graph, bar graph, etc.) of the memory utilization, for example, over a period of time, during execution of the ML model, etc.

In examples, other types of resource utilization data and processing data may be collected and/or generated. In examples, the utilization and/or release of one or more resources for a particular function may be requested and/or tracked. For example, the system may be configured to detect one or more particular function calls and store data associated with the function call (e.g., time detected, resource(s) implicated, memory utilization data associated with the function call (memory location, amount of memory used, how long memory used, etc.), ML engine making the function call, associated operations, etc.). In various examples, the system may be configured to detect specific types of resource utilization, such as the usage of particular memory locations (e.g., associated with one or more particular function calls), a length of time particular memory locations were used, a number of accesses of particular memory locations, etc.

In various examples, memory utilization data from the memory utilization log 290 may be used to perform statistical analysis to determine various properties of memory utilization during the execution of a ML model. For example, data from the log 290 may be used to determine if execution and/or resource utilization meets or exceeds one or more performance thresholds. Alternatively, or in addition, data from the log 290 may be linked or otherwise associated with particular pieces of model or engine code and/or may retrieve and/or display particular pieces of model or engine code when accessed (e.g., selected or activated in a visual representation of the memory utilization data from the memory utilization log 290). In various examples, the utilization of memory and/or other resources may be analyzed based on the data from the memory utilization log 290 to determine how utilization changes over time. In further examples, the utilization of memory and/or other resources may be analyzed based on the data from the memory utilization log 290 to determine one or more time periods associated with one or more particular memory allocations and determine associated budgets, such as an energy budget and/or a thermal budget, for example for particular operation. Such data may also, or instead, be aggregated to determine budgets for a model, engine, and/or sets of operations associated with a model and/or engine. In various examples, other components and related data may be tracked, such as data associated with one or more thermocouples (e.g., that may be used to determine a heat level at a particular area) and/or power consumption data. Any such data may be correlated with and/or used in the analysis of associated resource allocations, function call latency, operation latency, etc.

Figure 3:
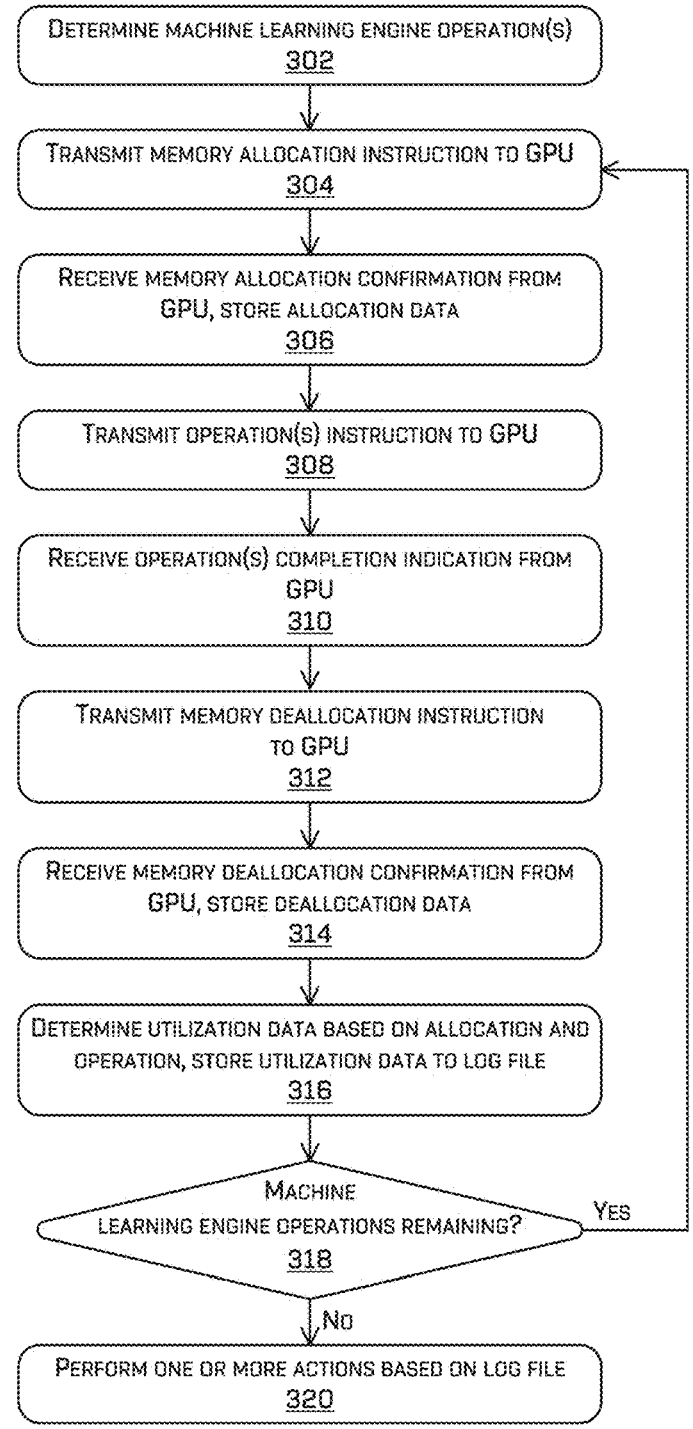
FIG. 3 is a pictorial flow diagram of an example process for allocating and deallocating memory and tracking memory utilization, in accordance with examples of the disclosure.

FIG. 3 is a pictorial flow diagram of an example process 300 for allocating memory and tracking memory utilization by an inference wrapper. In examples, one or more operations of the process 300 may be implemented by a computing system and may use one or more components, such as the one or more of the components and systems illustrated in FIGS. 2 and 5 and described below. For example, the process 300 may be implemented by one or more components and systems that can include processor(s) 212, processor(s) 222, a memory 214, and/or a memory 224 illustrated in FIG. 2. Alternatively, or in addition, the process 300 may be implemented by one or more components and systems that can include processor(s) 544 and/or a memory 546 illustrated in FIG. 5. One or more of the operations of the process 300 may also, or instead, be implemented using one or more autonomous vehicle components, such as by using one or more of the components and systems illustrated in FIG. 5 and described below. For example, the operations of the process 300 may use one or more components and systems that can include processor(s) 516, and/or a memory 518 illustrated in FIG. 5. However, the process 300 is not limited to being performed by and/or using such components and systems, and the components and systems of FIGS. 2 and 5 are not limited to performing the process 300.

The one or more operations of the process 300 may be directed to replacing or supplementing default memory operations, such as those used in a Compute Unified Device Architecture (CUDA) platform. The one or more operations of the process 300 may use one or more application programming interfaces and/or interface calls to implement the various operations described, such as the CUDA API. The one or more operations of the process 300 may also, or instead, be directed to performing allocation of one or more resources other than memory and/or of tracking the utilization of one or more resources other than memory as described herein.

At operation 302, an inference wrapper executing an ML model using an ML engine may determine that the ML engine is attempting to execute a particular ML model (and/or any other type of algorithm, process, software, instructions, etc.). Based on the determined ML model operation, the inference wrapper may determine that memory is required for completion of the operation, an amount of required memory, and/or a processing or computing device for execution of the ML model operation. For example, the inference wrapper may determine that the operations are to be performed on a GPU. The inference wrapper may store or otherwise indicate the memory requirements for the operations for use by a resource allocator. For example, the inference wrapper may allocate or otherwise reserve local resources (e.g., memory buffers) for the operations and/or may store data indicating the resource requirements of the operations.

At operation 304, a resource allocator may determine the resource requirements needed to perform the operations requested by the inference wrapper (e.g., based on the inference wrapper's locally stored data and/or locally allocated memory) and transmit an instruction to the determined execution device requesting that memory be allocated for the model operation. The instruction may include the amount of memory and/or one or more other parameters associated with a memory allocation.

At operation 306, the resource allocator may receive a memory allocation confirmation from the execution device that the memory has been successfully allocated for the operation. This confirmation may include memory allocation related data, such as the particular location of the allocated memory (e.g., memory addresses), the amount of memory successfully allocated, and/or an allocation identifier. Alternatively, or in addition, the resource allocator may receive one or more other memory allocation operation indications, such as an allocation failure indication or other error indication.

At operation 306 the resource allocator may also, or instead, generate and store an indication of the memory allocation operation, for example, for use in generating memory utilization data as described herein. This indication may include any suitable data, such as a time of transmitting the memory allocation instruction, a time of receiving a memory allocation confirmation, an amount of memory requested for allocation, an identifier of the ML model execution operation associated with the allocation, an identifier of one or more GPUs or other processing device to which the instruction was transmitted, a memory allocation identifier, one or more non-confirmation responses received (e.g., allocation failure), etc.

At operation 308, the resource allocator and/or the inference wrapper may transmit an instruction or series of instructions to the execution device requesting execution of a set of ML model execution operations. Individual instructions of these instructions may include an indication of the particular memory location(s) to use (e.g., memory addresses), an allocation identifier (e.g., as received in the associated allocation confirmation received at operation 306), an amount of memory, etc. The resource allocator and/or the inference wrapper may store or otherwise generate a record of the requests to perform the operations that may include any suitable data associated with the requests and/or the operations, such as an operation identifier, a time of the request, memory data associated with the request, an identifier of the ML model, an identifier of the associated ML engine, an identifier of one or more GPUs or other processing device to which the request was transmitted, etc.

At operation 310, the resource allocator and/or the inference wrapper may receive a confirmation from the execution device that the particular ML model execution operations has been successfully completed. Alternatively, or in addition, the resource allocator and/or the inference wrapper may receive one or more other related indications, such as an indication that an operation failed and/or that some other condition (e.g., error condition) has been detected that may be associated with the ML model execution operations. The resource allocator and/or the inference wrapper may store or otherwise generate a record of the indication received at operation 310 that may include any suitable data associated with a response to such a request and/or the operation, such as an operation identifier, a time of receiving the response, an identifier of the ML model, an identifier of the associated ML engine, an identifier of one or more GPUs or other processing device from which the response was transmitted, etc.

At operation 312, the resource allocator may transmit a memory deallocation instruction to the execution device to deallocate the memory that had been requested for the ML model execution operation (e.g., at operation 304). The deallocation instruction may include a memory location (e.g., memory addressed), a memory allocation identifier, an amount of memory and/or any other parameters suitable for memory deallocation.

At operation 314, the resource allocator may receive a memory deallocation confirmation from the execution device that the memory has been successfully deallocated or otherwise freed. The memory deallocation confirmation may include any suitable memory deallocation data, such as the particular location of the deallocated memory (e.g., memory addresses), the amount of memory successfully deallocated, an amount of time that the allocated memory was reserved, a memory deallocation identifier, and/or an allocation identifier (e.g., to confirm the particular allocation for which the deallocation was performed). Alternatively, or in addition, the resource allocator may receive one or more other memory allocation operation indications, such as an indication that the execution device failed to deallocate the memory.

Also at operation 314, the resource allocator may generate and store an indication of the memory deallocation operation, for example, for use in generating memory utilization data as described herein. This indication may include any suitable data, such as a time of transmitting the memory deallocation instruction, a time of receiving a memory deallocation confirmation, an amount of memory requested for deallocation, an identifier of the ML model operation(s) associated with the deallocation and/or the initial allocation, an identifier of the one or more GPUs or other processing device to which the instruction was transmitted, a memory deallocation identifier, a memory allocation identifier associated with the initial allocation, one or more non-confirmation responses received (e.g., deallocation failure), etc.

At operation 316, the resource allocator may process the memory allocation related data collected and/or generated in one or more of the previous operations to generate memory utilization data that can be stored in a memory utilization log. For example, the resource allocator may determine, for a particular memory allocation operation, the length of time memory was reserved, the amount of memory reserved, the location of the memory (e.g., memory addresses), one or more identifiers of the allocated memory, one or more allocation identifiers and/or deallocation identifiers, one or more errors or other indications associated with the allocation, an identifier of the ML model executing during the allocation, an identifier of the particular ML model operation that initiated the allocation, an identifier of the ML engine executing the operation, an inference wrapper identifier, an identifier of the execution device, an identifier of the processor or device executing the inference wrapper, etc.

At operation 318, the resource allocator may determine whether there are any other ML model execution operations to be performed. For example, if the most recently executed ML model execution operation is the last ML model operation to be performed (e.g., is the final instruction in the instruction set associated with the model, if a termination condition has been satisfied, etc.), the resource allocator may determine that model execution is complete and proceed to operation 320. If the resource allocator determines that there are one or more further ML model execution operations to be performed (e.g., that the inference wrapper has allocated another block of memory associated with resources associated with the resource allocator), the resource allocator may return to operation 304 to determine the next allocation operation to be executed.

At operation 320, the resource allocator and/or an associated device or system may take one or more actions based on the log file and/or data represented in the log file. For example, the inference wrapper and/or an associated device or system may generate a visual representation (e.g., a flame graph, bar graph, etc.) of the memory utilization data represented in the log file. Alternatively, or in addition, the resource allocator and/or an associated device or system may determine memory utilization over a period of time, during execution of the ML model, etc. In various examples, memory utilization data may be used to perform statistical analysis to determine various properties of memory utilization during the execution of a ML model as described herein. Alternatively, or in addition, data from the log file may be linked or otherwise associated with particular pieces of model or engine code and/or may retrieve and/or display particular pieces of model or engine code when accessed or selected via a visual representation of the memory utilization data. Rates of change over time and/or budgets associated with various operations, models, engine, and/or sets of operation may also be determined based on data included in a log file, for example, as described herein.

In various examples, the model executed by the process 300 may be configured at a computing device of a vehicle (e.g., an autonomous vehicle). For example, the model may be transmitted to the computing device of the vehicle for use in controlling the vehicle. In examples, the data from the log file may be evaluated to determine whether to transmit the model to a vehicle's computing device. If data from the log file meets one or more criteria, the model may be transmitted to the vehicle's computing device. For example, if the data indicates that a model uses less than a threshold amount of memory (e.g., meets a criterium indicating an amount of memory used), the model may be transmitted to the vehicle's computing device. In another example, if the model successfully performs a particular set of operations under a threshold amount of time (e.g., meets a criterium indicating a maximum amount of latency), the model may be transmitted to the vehicle's computing device. Any combination of criteria and resource utilization data is contemplated as being used to determine whether to transmit a model to a vehicle's computing device.

Figure 4:
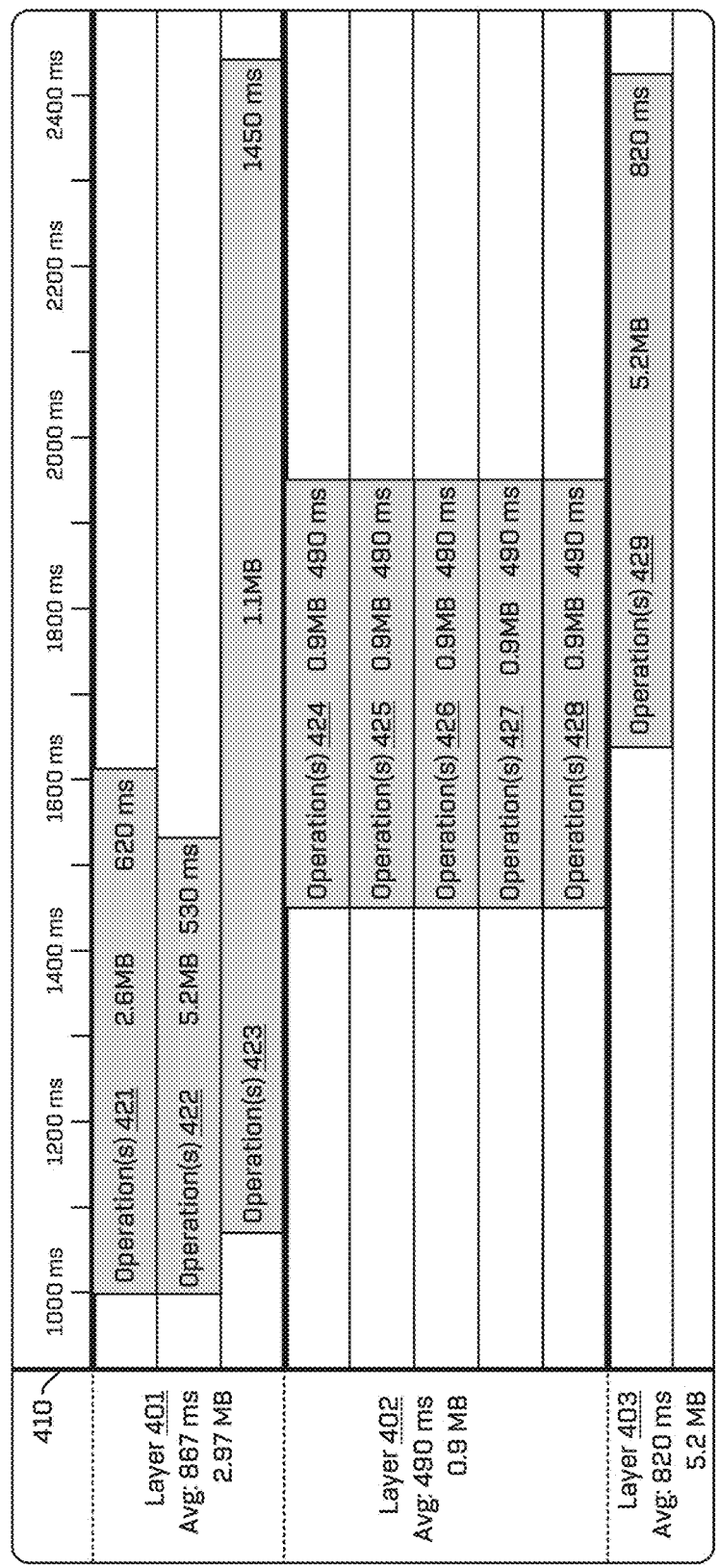
FIG. 4 is a diagrammatic representation of an example visual representation of resource utilization data, in accordance with examples of the disclosure.

For example, and referring now to FIG. 4, the memory utilization data generated by the resource allocator may be used to generate a visual representation 400 that may include a graph (e.g., flame graph) representing memory utilization data for one or more operations executed and for which memory was allocated. For example, the operations 421-429 are illustrated in FIG. 4 with the visual representation of the individual operations indicating a time of memory utilization and an amount of memory utilized. In various examples, the bars associated with individual operations may be color-coded, for example, based on a time of memory utilization and/or an amount of memory used. A scale 410 may be included in the visual representation 400 indicating a scale of time and/or utilization.

Aggregated data may also be presented in the visual representation 400. For example, the layers associated with the various operations may be indicated and aggregated date may be presented for individual layers. In various examples, neural network layers may be represented and associated with the operations executed by the individual layers. For example, as shown in this figure, the operations 421, 422, and 423 may be associated with the layer 401, which may be presented with an indication of an average time and amount of memory utilized for that layer. Similarly, layers 424-428 may be associated with layer 402 which may also be presented with an indication of an average time and amount of memory utilized for that layer and layer 429 may be associated with layer 403 which may also be presented with an indication of an average time and amount of memory utilized for that layer.

Any other suitable memory utilization and/or resources utilization data that may be generated by an inference wrapper may be used in a visual representation of such data. The data collected and generated may be used to perform various improvements to computer vision and other systems by facilitating the identification of resource utilization bottleneck, resource utilization optimization, etc.

The ML models executed using the techniques described herein may be executed initially in a testing environment (e.g., trained using training data) and may then be implemented in a production environment, such as in an autonomous vehicle, using live data from an environment. The input data used by the models may be sensor data, or may originate with sensor data (e.g., image data, detection data, etc.) such as that described herein.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, one or more system controllers 526, one or more maps 528, a prediction component 530, and a deep tracking network component 532. Though depicted in FIG. 5 as residing in memory 518 for illustrative purposes, it is contemplated that each of the localization component 520, the perception component 522, the planning component 524, the one or more system controllers 526, the one or more maps 528, the prediction component 530, and the deep tracking network component 532 can additionally, or alternatively, be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment. In examples, the planning component 524 can determine various routes and trajectories and various levels of detail. For example, the planning component 524 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

The memory 518 can further include one or more maps 528 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 528 can include at least one map (e.g., images and/or a mesh). In some examples, the vehicle 502 can be controlled based at least in part on the maps 528. That is, the maps 528 can be used in connection with the localization component 520, the perception component 522, and/or the planning component 524 to determine a location of the vehicle 502, identify objects in an environment, and/or generate routes and/or trajectories to navigate within an environment.

In some examples, the one or more maps 528 can be stored on a remote computing device(s) (such as the computing device(s) 542) accessible via network(s) 540. In some examples, multiple maps 528 can be stored based on, for example, a characteristic (e.g., type of entity, time of day, day of week, season of the year, etc.). Storing multiple maps 528 can have similar memory requirements but increase the speed at which data in a map can be accessed.

In general, the prediction component 530 can generate predicted trajectories of objects in an environment. For example, the prediction component 530 can generate one or more predicted trajectories for vehicles, pedestrians, animals, and the like within a threshold distance from the vehicle 502. In some instances, the prediction component 530 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 518 (and the memory 546, discussed below) can be implemented as a neural network. For instance, the memory 518 may include a deep tracking network 532 that may be configured with a neural network 534. The neural network 534 may include one or more convolutional layers and/or deconvolutional layers.

As described herein, an example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling factor. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 540, to the one or more computing device(s) at a particular frequency, after a lapse of a predetermined period of time, in near real-time, etc.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data to one or more computing device(s) 542 via the network(s) 540. In some examples, the vehicle 502 can send raw sensor data to the computing device(s) 542. In other examples, the vehicle 502 can send processed sensor data and/or representations of sensor data (e.g., multichannel data structures representing sensor data) to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files.

The computing device(s) 542 can include processor(s) 544 and a memory 546 storing a deep tracking network component 550 and/or a perception component 548. In some instances, the deep tracking network component 550 can substantially correspond to the deep tracking network component 532 and can include substantially similar functionality. For example, the deep tracking network component 550 may include a neural network 552 that may be configured with one or more convolution layers and/or deconvolution layers. In some instances, the perception component 548 can substantially correspond to the perception component 522 and can include substantially similar functionality.

The processor(s) 516 of the vehicle 502 and the processor(s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

EXAMPLE CLAUSES

A: A system comprising: one or more processors; and one or more non-transitory computer-readable media storing instructions executable by the one or more processors, wherein the instructions, when executed, cause the system to perform operations comprising: receiving a machine learned model comprising a plurality of operations; and executing the machine learned model on one or more central processing units of the one or more processors, wherein executing the machine learned model comprises: receiving, via an inference wrapper, a first request to allocate an amount of memory associated with one or more graphics processing units of the one or more processors; requesting, from the one or more graphics processing units and based at least in part on the first request, to allocate the amount of memory; receiving, from the one or more graphics processing units, an indication that the amount of memory has been successfully allocated; storing, to a log and based at least in part on the inference wrapper, the amount of memory and a first time associated with the indication; receiving, via the inference wrapper, a second request to deallocate memory; requesting, from the one or more graphics processing units, to deallocate the memory; receiving a memory deallocation confirmation from the one or more graphics processing units; storing, to the log and based at least in part on the inference wrapper, a second time associated with the memory deallocation confirmation; determining, based at least in part on the log, memory utilization data; and generating a visual representation of the memory utilization data.

B: The system of paragraph A, wherein the memory utilization data comprises a memory utilization duration.

C: The system of paragraph A or B, wherein the memory utilization data comprises an amount of memory utilized.

D: The system of any of paragraphs A-C, wherein the memory utilization data comprises one or more of: a process identifier; a device identifier; an identifier of the one or more graphics processing units; or an identifier of the one or more central processing units.

E: The system of any of paragraphs A-D, wherein executing the machine learned model further comprises: determining an amount of time between requesting to allocate the amount of memory and the first time associated with the indication; and storing, to the log and based at least in part on the inference wrapper, the amount of time.

F: The system of any of paragraphs A-E, wherein: executing the machine learned model comprises using a first machine learning engine executed by the one or more central processing units to execute the machine learned model; and the operations further comprise using a second machine learning engine executed by the one or more central processing units to execute the machine learned model.

G: A method comprising: receiving a machine learned model at a first processing device; executing the machine learned model using an inference wrapper at the first processing device; transmitting a memory allocation command to a second processing device based at least in part on the inference wrapper; receiving a memory allocation confirmation from the second processing device; transmitting a memory deallocation command to the second processing device based at least in part on the inference wrapper; receiving a memory deallocation confirmation from the second processing device; generating memory utilization data based at least in part on the inference wrapper, the memory allocation confirmation, and the memory deallocation confirmation; and generating a visual representation indicating the memory utilization data and an identifier of the machine learned model.

H: The method of paragraph G, wherein: the memory allocation command comprises a command to allocate a first amount of memory; the memory deallocation command comprises a command to deallocate a second amount of memory; and the first amount of memory is greater than the second amount of memory.

I: The method of paragraph G or H, further comprising determining a memory allocation time period based at least in part on the memory allocation confirmation and the memory deallocation confirmation.

J: The method of paragraph I, further comprising determining one or more of an energy budget for the execution of the machine learned model or a thermal budget for the execution of the machine learned model based at least in part on the memory allocation time period.

K: The method of any of paragraphs G-J, further comprising transmitting the machine learned model to a computing system configured at an autonomous vehicle, wherein the autonomous vehicle is controlled based at least in part by the machine learned model.

L: The method of paragraph K, wherein transmitting the machine learned model to the computing system configured at the autonomous vehicle is based at least in part on determining that the memory utilization data meets a criterium.

M: The method of any of paragraphs G-L, wherein the machine learned model comprises one or more of a perception model, a prediction model, a localization model, or a planning model associated with controlling a vehicle.

N: The method of any of paragraphs G-M, wherein transmitting the memory allocation command to the second processing device is further based at least in part on data stored in a memory buffer by the inference wrapper.

O: The method of any of paragraphs G-N, wherein the memory utilization data comprises one or more of: a memory allocation latency; a memory deallocation latency; a process identifier; or the identifier of the machine learned model.

P: One or more non-transitory computer-readable media storing instructions that, when executed by one or more processors, perform operations comprising: receiving a machine learned model at a first processing device of the one or more processors; executing the machine learned model using an inference wrapper at the first processing device; transmitting a resource utilization request to a second processing device of the one or more processors based at least in part on the inference wrapper; receiving a resource utilization confirmation from the second processing device; transmitting a resource release request to the second processing device based at least in part on the inference wrapper; receiving a resource release confirmation from the second processing device; generating resource utilization data based at least in part on the inference wrapper, the resource utilization confirmation, and the resource release confirmation; and generating a visual representation indicating the resource utilization data.

Q: The one or more non-transitory computer-readable media of paragraph P, wherein: executing the machine learned model comprises using a first machine learning engine to execute the machine learned model using the inference wrapper; and the operations further comprise using a second machine learning engine to execute the machine learned model using the inference wrapper.

R: The one or more non-transitory computer-readable media of paragraph P or Q, wherein: using the first machine learning engine to execute the machine learned model using the inference wrapper comprises using the first machine learning engine to execute the machine learned model using model input data; and using the second machine learning engine to execute the machine learned model using the inference wrapper comprises using the second machine learning engine to execute the machine learned model using the model input data.

S: The one or more non-transitory computer-readable media of any of paragraphs P-R, wherein generating the resource utilization data comprises determining a resource utilization duration based at least in part on the resource utilization confirmation and the resource release confirmation.

T: The one or more non-transitory computer-readable media of any of paragraphs P-S, wherein the visual representation comprises one or more of: an indication of the execution of the machine learned model; an indication of the machine learned engine; an indication of the machine learned model; an indication of the first processing device; or an indication of the second processing device.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
configuring an inference wrapper at a first processing device, with a machine learning engine of a plurality of machine learning engines supported by the inference wrapper to facilitate execution of a machine learned model;
receiving, at the first processing device, the machine learned model comprising a plurality of operations; and
executing the machine learned model, using the inference wrapper, on one or more central processing units of the one or more processors at the first processing device, wherein executing the machine learned model comprises:
transmitting, from the inference wrapper to a resource allocator of the first processing device and based at least in part on the machine learning engine, a first request to allocate an amount of memory;
determining, by the resource allocator and based at least in part on the first request, one or more graphics processing units of a second processing device;
requesting, by the resource allocator from the one or more graphics processing units and based at least in part on the first request, to allocate the amount of memory;
receiving, by the resource allocator from the one or more graphics processing units, an indication that the amount of memory has been successfully allocated;
storing, by the resource allocator to a log and based at least in part on the inference wrapper, the amount of memory and a first time associated with the indication;
transmitting, by the resource allocator to the inference wrapper, the indication;
transmitting, from the inference wrapper to the one or more graphics processing units and based at least in part on the indication, an operation execution request to perform an operation of the plurality of operations;
performing, by the one or more graphics processing units and based at least in part on the operation execution request, the operation of the plurality of operations;
receiving, at the inference wrapper from the one or more graphics processing units, an operation completion indication;
transmitting, from the inference wrapper to the resource allocator and based at least in part on the machine learning engine and the operation completion indication, a second request to deallocate memory;
determining, by the resource allocator and based at least in part on the second request, the one or more graphics processing units;

requesting, by the resource allocator from the one or more graphics processing units, to deallocate the memory;
receiving, by the resource allocator from the one or more graphics processing units, a memory deallocation confirmation;
storing, by the resource allocator to the log and based at least in part on the inference wrapper, a second time associated with the memory deallocation confirmation;
determining, at the resource allocator and based at least in part on the log, memory utilization data; and
generating, by the inference wrapper, a visual representation of the memory utilization data.

2. The system of claim 1, wherein the memory utilization data comprises a memory utilization duration.

3. The system of claim 1, wherein the memory utilization data comprises a second amount of memory utilized.

4. The system of claim 1, wherein the memory utilization data comprises one or more of:
a process identifier;
a device identifier;
an identifier of the one or more graphics processing units; or
an identifier of the one or more central processing units.

5. The system of claim 1, wherein executing the machine learned model further comprises:
determining, by the resource allocator, an amount of time between requesting to allocate the amount of memory and the first time associated with the indication; and
storing, by the resource allocator to the log and based at least in part on the inference wrapper, the amount of time.

6. The system of claim 1, wherein the operations further comprise using a second machine learning engine of the plurality of machine learning engines executed by the one or more central processing units to execute the machine learned model.

7. A method comprising:
configuring an inference wrapper at a first processing device, with a machine learning engine of a plurality of machine learning engines supported by the inference wrapper to facilitate execution of a machine learned model;
receiving, at the first processing device, a machine learned model comprising a plurality of operations;
executing the machine learned model using the inference wrapper at the first processing device;
transmitting a memory allocation command to allocate an amount of memory from the inference wrapper to a resource allocator of the first processing device based at least in part on the machine learning engine;
determining, by the resource allocator and based at least in part on the memory allocation command, a second processing device;
transmitting the memory allocation command from the resource allocator to the second processing device to allocate the amount of memory;
receiving a memory allocation confirmation at the resource allocator from the second processing device;
storing, by the resource allocator to a log and based at least in part on the inference wrapper, the amount of memory and a first time associated with the memory allocation confirmation;
transmitting the memory allocation confirmation from the resource allocator to the inference wrapper;
transmitting, from the inference wrapper to the second processing device and based at least in part on the memory allocation confirmation, an operation execution request to perform an operation of the plurality of operations;
performing the operation at the second processing device;
receiving an operation completion indication at the inference wrapper from the second processing device;
transmitting, from the inference wrapper to the resource allocator and based at least in part on the machine learning engine and the operation completion indication, a memory deallocation command;
determining, by the resource allocator and based at least in part on the memory deallocation command, the second processing device;
transmitting the memory deallocation command from the resource allocator to the second processing device to deallocate memory;
receiving a memory deallocation confirmation at the resource allocator from the second processing device;
storing, by the resource allocator to the log and based at least in part on the inference wrapper, a second time associated with the memory deallocation confirmation;
generating memory utilization data at the resource allocator based at least in part on the inference wrapper, the memory allocation confirmation, and the memory deallocation confirmation; and
generating, by the inference wrapper, a visual representation indicating the memory utilization data and an identifier of the machine learned model.

8. The method of claim 7, wherein:
the memory allocation command comprises a command to allocate a first amount of memory;
the memory deallocation command comprises a command to deallocate a second amount of memory; and
the first amount of memory is greater than the second amount of memory.

9. The method of claim 7, further comprising determining a memory allocation time period based at least in part on the memory allocation confirmation and the memory deallocation confirmation.

10. The method of claim 9, further comprising determining one or more of an energy budget for the execution of the machine learned model or a thermal budget for the execution of the machine learned model based at least in part on the memory allocation time period.

11. The method of claim 7, further comprising transmitting the machine learned model to a computing system configured at an autonomous vehicle, wherein the autonomous vehicle is controlled based at least in part by the machine learned model.

12. The method of claim 11, wherein transmitting the machine learned model to the computing system configured at the autonomous vehicle is based at least in part on determining that the memory utilization data meets a criterium.

13. The method of claim 7, wherein the machine learned model comprises one or more of a perception model, a prediction model, a localization model, or a planning model associated with controlling a vehicle.

14. The method of claim 7, wherein transmitting the memory allocation command to the second processing device is further based at least in part on data stored in a memory buffer by the inference wrapper.

15. The method of claim 7, wherein the memory utilization data comprises one or more of:
- a memory allocation latency;
- a memory deallocation latency;
- a process identifier; or
- the identifier of the machine learned model.

16. One or more non-transitory computer-readable media storing instructions that, when executed by one or more processors, perform operations comprising:
- receiving a machine learned model comprising a plurality of operations at a first processing device of the one or more processors;
- configuring, at the first processing device, an inference wrapper with a machine learning engine of a plurality of machine learning engines supported by the inference wrapper to facilitate execution of the machine learned model;
- executing, at the first processing device, the machine learned model using the machine learning engine configured at the inference wrapper;
- transmitting, from the inference wrapper to a resource allocator of the first processing device and based at least in part on the machine learning engine, a resource utilization request to allocate an amount of a resource;
- determining, by the resource allocator and based at least in part on the resource utilization request, a second processing device;
- transmitting the resource utilization request from the resource allocator to the second processing device;
- receiving a resource utilization confirmation at the resource allocator from the second processing device;
- storing, by the resource allocator to a log and based at least in part on the inference wrapper, the amount of the resource and a first time associated with the resource utilization confirmation;
- transmitting the resource utilization confirmation from the resource allocator to the inference wrapper;
- transmitting, from the inference wrapper to the second processing device and based at least in part on the resource utilization confirmation, an operation execution request to perform an operation of the plurality of operations;
- performing the operation at the second processing device;
- receiving an operation completion indication at the inference wrapper from the second processing device;
- transmitting, from the inference wrapper to the resource allocator and based at least in part on the machine learning engine and the operation completion indication, a resource release request;
- determining, by the resource allocator and based at least in part on the resource release request, the second processing device;
- transmitting the resource release request from the resource allocator to the second processing device to release the resource;
- receiving a resource release confirmation at the resource allocator from the second processing device;
- storing, by the resource allocator to the log and based at least in part on the inference wrapper, a second time associated with the resource release confirmation;
- generating resource utilization data at the resource allocator based at least in part on the inference wrapper, the resource utilization confirmation, and the resource release confirmation; and
- generating, by the inference wrapper, a visual representation indicating the resource utilization data.

17. The one or more non-transitory computer-readable media of claim 16, wherein the operations further comprise using a second machine learning engine of the plurality of machine learning engines to execute the machine learned model using the inference wrapper.

18. The one or more non-transitory computer-readable media of claim 17, wherein:
- using the machine learning engine to execute the machine learned model using the inference wrapper comprises using the machine learning engine to execute the machine learned model using model input data; and
- using the second machine learning engine to execute the machine learned model using the inference wrapper comprises using the second machine learning engine to execute the machine learned model using the model input data.

19. The one or more non-transitory computer-readable media of claim 16, wherein generating the resource utilization data comprises determining a resource utilization duration based at least in part on the resource utilization confirmation and the resource release confirmation.

20. The one or more non-transitory computer-readable media of claim 16, wherein the visual representation comprises one or more of:
- an indication of the execution of the machine learned model;
- an indication of the machine learning engine;
- an indication of the machine learned model;
- an indication of the first processing device; or
- an indication of the second processing device.

* * * * *